United States Patent
Yamamoto et al.

(10) Patent No.: US 12,535,824 B2
(45) Date of Patent: Jan. 27, 2026

(54) MOVING BODY CONTROL DEVICE, MOVING BODY CONTROL METHOD, AND NON-TRANSIENT COMPUTER-READABLE RECORDING MEDIUM

(71) Applicant: Honda Motor Co., Ltd., Tokyo (JP)

(72) Inventors: Sachiko Yamamoto, Saitama (JP); Shota Yamaguchi, Saitama (JP); Naoto Shikano, Saitama (JP); Marika Mochizuki, Saitama (JP); Makoto Hasegawa, Saitama (JP); Shinichiro Kobashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 366 days.

(21) Appl. No.: 17/978,233

(22) Filed: Nov. 1, 2022

(65) Prior Publication Data

US 2023/0168690 A1 Jun. 1, 2023

(30) Foreign Application Priority Data

Nov. 30, 2021 (JP) .................................. 2021-194502

(51) Int. Cl.
*G05D 1/00* (2024.01)
(52) U.S. Cl.
CPC ......... *G05D 1/0293* (2013.01); *G05D 1/0223* (2013.01); *G05D 1/0295* (2013.01)
(58) Field of Classification Search
CPC .. G05D 1/0293; G05D 1/0223; G05D 1/0295; G05D 1/0289
See application file for complete search history.

(56) References Cited

U.S. PATENT DOCUMENTS

| | | | | |
|---|---|---|---|---|
| 11,994,874 B1 * | 5/2024 | Paschall | ............... | G05D 1/0293 |
| 2016/0027307 A1 * | 1/2016 | Abhyanker | ............ | G08G 1/005 |
| | | | | 701/117 |
| 2019/0096265 A1 * | 3/2019 | Mok | ..................... | G08G 1/163 |

(Continued)

FOREIGN PATENT DOCUMENTS

| | | | | | |
|---|---|---|---|---|---|
| CN | 107966905 A | * | 4/2018 | .......... | G05B 13/042 |
| JP | 5337650 | | 11/2013 | | |

(Continued)

OTHER PUBLICATIONS

Machine Translation CN-107966905-A (Year: 2018).*

(Continued)

*Primary Examiner* — Anne Marie Antonucci
*Assistant Examiner* — Wesam Almadhrhi
(74) *Attorney, Agent, or Firm* — JCIPRNET

(57) ABSTRACT

The disclosure provides a moving body control device, a moving body control method, and a non-transient computer-readable recording medium recording a program capable of moving multiple vehicles as a group with a higher degree of freedom. A moving body control device includes: a positional relationship grasping part that grasps a positional relationship of multiple vehicles; and a vehicle control part that controls a movement mode of the multiple vehicles based on the positional relationship. The vehicle control part controls the multiple vehicles to move as a group and, according to a movement result of a part of vehicles among the multiple vehicles, changes a movement mode of another vehicle different from the part of vehicles.

14 Claims, 14 Drawing Sheets

(56) References Cited

U.S. PATENT DOCUMENTS

| | | |
|---|---|---|
| 2020/0004269 A1 | 1/2020 | Oba |
| 2020/0234599 A1* | 7/2020 | Boegel ................. G08G 1/22 |
| 2020/0393847 A1* | 12/2020 | Govindan ............ G05D 1/0295 |
| 2021/0041893 A1 | 2/2021 | Matsumoto et al. |
| 2021/0255630 A1 | 8/2021 | Suzuki et al. |
| 2022/0185290 A1* | 6/2022 | Sanfridson ............. G08G 1/167 |

FOREIGN PATENT DOCUMENTS

| | | |
|---|---|---|
| JP | 2019028733 | 2/2019 |
| JP | 2021028748 | 2/2021 |
| JP | 2021157203 | 10/2021 |
| WO | 2018147041 | 8/2018 |

OTHER PUBLICATIONS

"Office Action of Japan Counterpart Application", issued on Jul. 2, 2024, with English translation thereof, p. 1-p. 8.
"Office Action of Japan Counterpart Application", issued on Nov. 19, 2024, with English translation thereof, p. 1-p. 6.
"Office Action of Japan Counterpart Application", issued on Nov. 8, 2024, with English translation thereof, p. 1-p. 6.

* cited by examiner

MOVING BODY CONTROL DEVICE, MOVING BODY CONTROL METHOD, AND NON-TRANSIENT COMPUTER-READABLE RECORDING MEDIUM

CROSS-REFERENCE TO RELATED APPLICATION

This application claims the priority benefit of Japan application Ser. No. 2021-194502, filed on Nov. 30, 2021. The entirety of the above-mentioned patent application is hereby incorporated by reference herein and made a part of this specification.

BACKGROUND

Technical Field

The disclosure relates to a moving body control device, a moving body control method, and a non-transient computer-readable recording medium recording a program.

Related Art

Conventionally, a method of moving multiple inverted pendulum type vehicles as a group has been proposed. For example, Patent Literature 1 discloses a method in which multiple vehicles are connected to each other in a row in the front-rear direction by using a string-shaped body such as a wire or a chain, and a vehicle traveling in the front (hereinafter referred to as a front vehicle) pulls a vehicle traveling in the rear (hereinafter referred to as a rear vehicle) to travel in a row.

CITATION LIST

Patent Literature

[Patent Literature 1] Japanese Granted Patent Publication No. 5337650

However, when the occupants of multiple vehicles move together as a group, if the multiple vehicles are connected by a string-shaped body, the distance and the positional relationship are limited, which is inconvenient when it is desired to change these. It is inconvenient because it is necessary to stop first when traveling. In addition, even when stopped, it is necessary to change the connection of the string-shaped body, which is troublesome.

The disclosure has been made in consideration of such circumstances, and provides a moving body control device, a moving body control method, and a non-transient computer-readable recording medium recording a program capable of moving multiple vehicles as a group with a higher degree of freedom.

SUMMARY

The moving body control device, the moving body control method, and the non-transient computer-readable recording medium recording the program according to the disclosure adopt the following configurations.

(1) A moving body control device according to an embodiment of the disclosure includes: a positional relationship grasping part that grasps a positional relationship of multiple vehicles; and a vehicle control part that controls a movement mode of the multiple vehicles based on the positional relationship. The vehicle control part controls the multiple vehicles to move as a group and, according to a movement result of a part of vehicles among the multiple vehicles, changes a movement mode of another vehicle different from the part of vehicles.

(10): In a moving body control method according to an embodiment of the disclosure, a computer performs: grasping a positional relationship of multiple vehicles; performing a vehicle control process for controlling a movement mode of the multiple vehicles based on the positional relationship; and in the vehicle control process, controlling the multiple vehicles to move as a group and, according to a movement result of a part of vehicles among the multiple vehicles, changing a movement mode of another vehicle different from the part of vehicles.

(11): A non-transient computer-readable recording medium according to an embodiment of the disclosure records a program which causes a computer to perform: grasping a positional relationship of multiple vehicles; performing a vehicle control process for controlling a movement mode of the multiple vehicles based on the positional relationship; and in the vehicle control process, controlling the multiple vehicles to move as a group and, according to a movement result of a part of vehicles among the multiple vehicles, changing a movement mode of another vehicle different from the part of vehicles.

Figure 1:
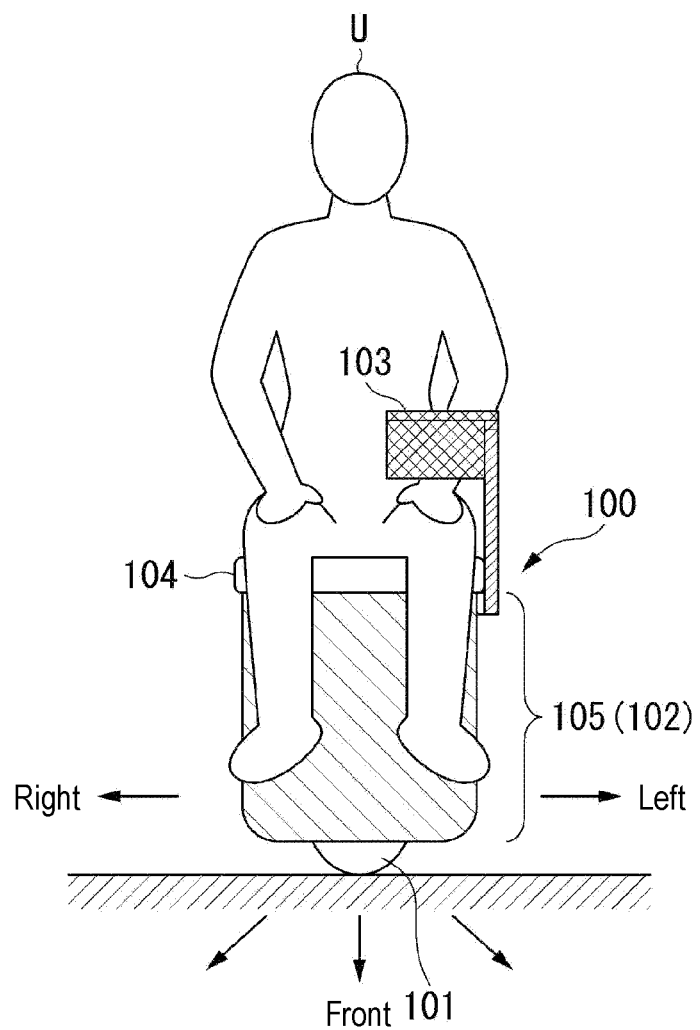
FIG. 1 is a first diagram showing an outline of the appearance of an inverted pendulum type vehicle according to a vehicle control system of this embodiment.

DESCRIPTION OF THE EMBODIMENTS (2): In the above aspect (1), the multiple vehicles include a first vehicle as a master device that leads a slave device and a second vehicle as the slave device that is led by the first vehicle, and the vehicle control part causes the first vehicle to move in a predetermined direction and causes the second vehicle to follow the first vehicle.

(3): In the above aspect (2), the second vehicle is able to leave the group by an operation of an occupant, and when a third vehicle among the second vehicle leaves the group, the vehicle control part causes the first vehicle to follow the third vehicle.

(4): In the above aspect (3), the vehicle control part controls a following speed of the first vehicle in a way in which the first vehicle approaches the third vehicle faster when a distance between the first vehicle and the third vehicle is larger.

(5): In the above aspect (3) or (4), the vehicle control part causes the first vehicle to indicate a direction of the third vehicle as seen from the first vehicle.

(6): In any of the above aspects (2) to (5), the second vehicle includes a fourth vehicle that has been prohibited from leaving the group in advance, and the vehicle control part controls the fourth vehicle so as not to leave the group.

(7): In any of the above aspects (2) to (6), at least the first vehicle among the multiple vehicles is an omnidirectional moving vehicle, and when the first vehicle is traveling, the vehicle control part always directs a front of the first vehicle toward a direction of any of the second vehicle regardless of a traveling direction.

(8): In any of the above aspects (1) to (7), the multiple vehicles are omnidirectional moving vehicles, and when the multiple vehicles are traveling, the vehicle control part directs fronts of the multiple vehicles in a same direction regardless of a traveling direction.

(9): In any of the above aspects (1) to (8), the vehicle control part makes an inter-vehicle distance of the multiple vehicles when the multiple vehicles are traveling under a specific situation smaller than the inter-vehicle distance when the multiple vehicles are not traveling under the specific situation.

According to the above aspects (1) to (11), multiple vehicles may be moved as a group with a higher degree of freedom.

Hereinafter, embodiments of a moving body control device, a moving body control method, and a program of the disclosure will be described with reference to the drawings.

Figure 2:
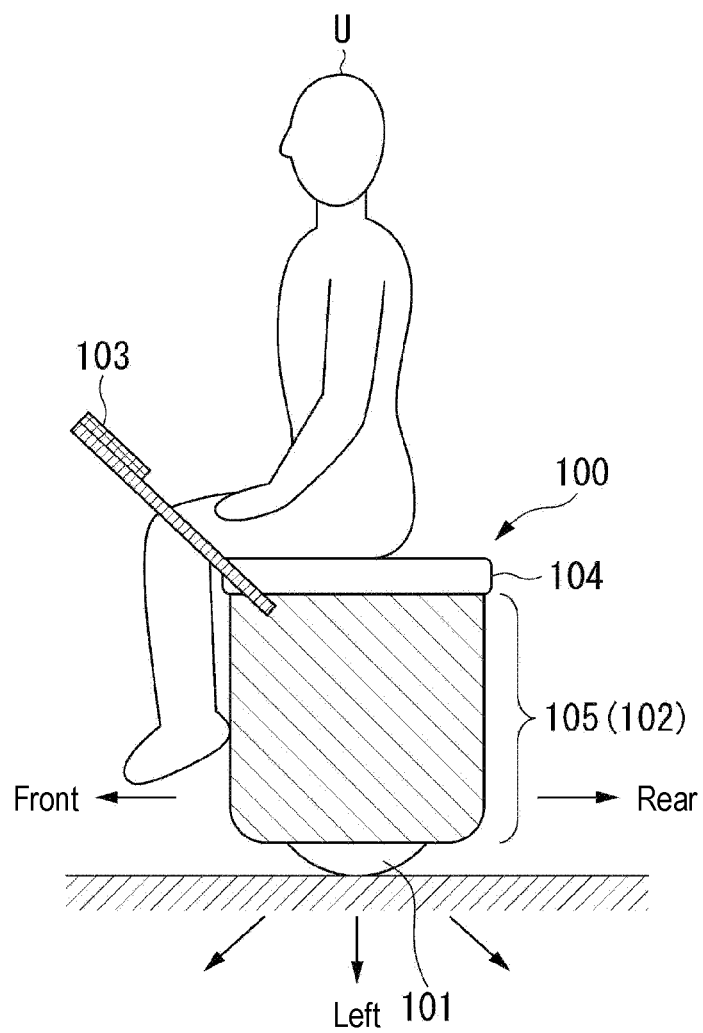
FIG. 2 is a second diagram showing an outline of the appearance of an inverted pendulum type vehicle according to a vehicle control system of this embodiment.

FIG. 1 and FIG. 2 are diagrams showing an outline of the appearance of an inverted pendulum type vehicle 100 according to a vehicle control system 1 of this embodiment. The vehicle control system 1 is a system that controls multiple inverted pendulum type vehicles 100 to move as a group. FIG. 1 shows the appearance seen from the front direction, and FIG. 2 shows the appearance seen from the side direction. The inverted pendulum type vehicle 100 is a vehicle in which a boarding part is provided on a base in which a moving mechanism for moving on the floor surface and a drive device for driving the moving mechanism are assembled, and it is a vehicle configured to change the traveling direction in the tilting direction when a user U (occupant) who has boarded the boarding part tilts his or her body with respect to the vertical direction.

The inverted pendulum type vehicle 100 includes, for example, an omnidirectional moving wheel 101 as a moving mechanism, a drive device 102 for driving the omnidirectional moving wheel 101, an operation panel 103, a boarding part 104, and a base 106 for integrally assembling them. The omnidirectional moving wheel 101 is a wheel that enables the vehicle to immediately advance in any direction (all directions of 360 degrees) from the current position (omnidirectional movement) without performing a preliminary operation such as turning.

Figure 3:
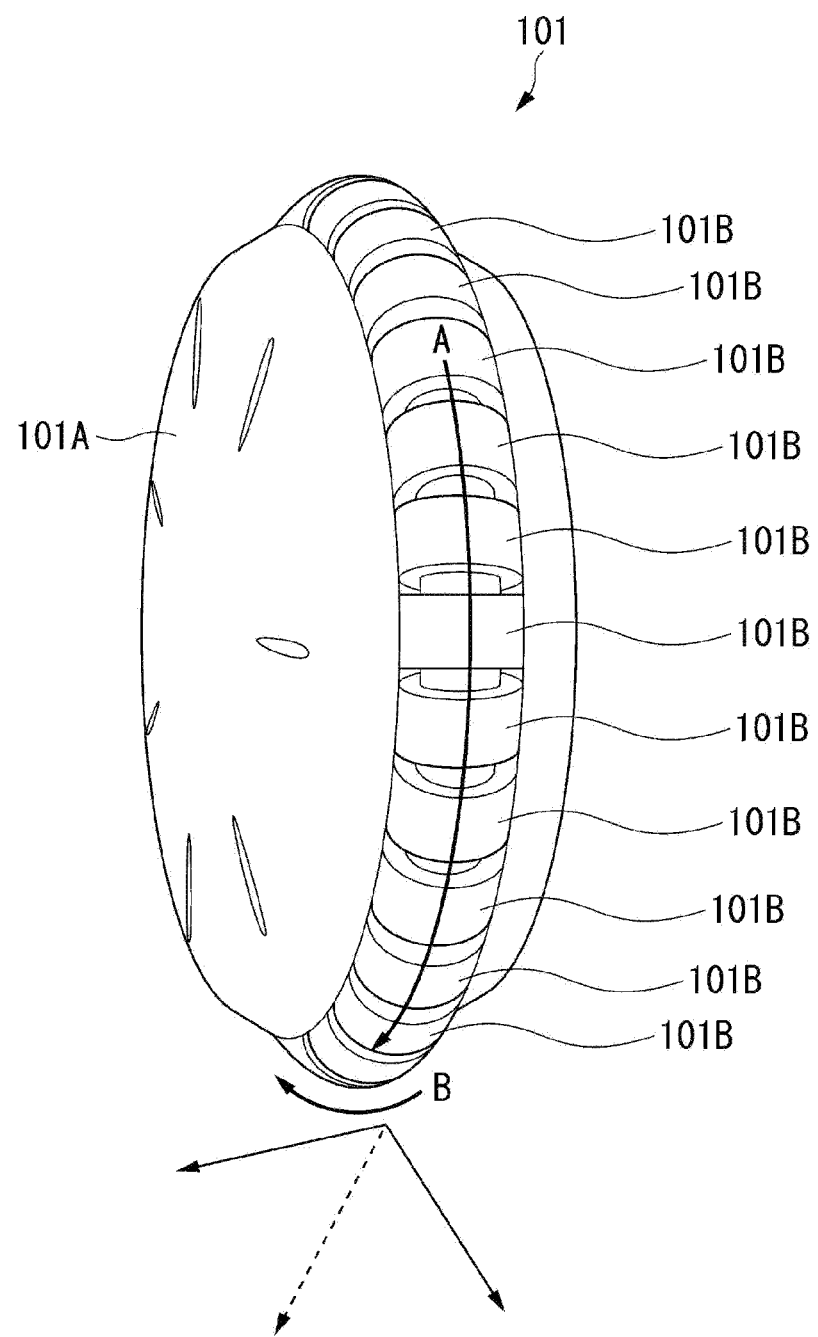
FIG. 3 is a diagram showing an outline of the configuration of the omnidirectional moving wheel.

FIG. 3 is a diagram showing an outline of the configuration of the omnidirectional moving wheel 101. The omnidirectional moving wheel 101 includes, for example, a large diameter wheel 101A and multiple small diameter wheels 101B arranged along the circumference of the large diameter wheel 101A. The large diameter wheel 101A is a wheel that mainly realizes straight-ahead movement in the front-rear direction. The small diameter wheel 101B is a wheel that mainly realizes lateral movement on the spot by rotating in the direction of arrow B about the rotation direction (circumferential direction; arrow A) of the large diameter wheel 101A. The omnidirectional moving wheel 101 is driven by a motor (not shown) that may independently control the rotation of the large diameter wheel 101A and the small diameter wheels 101B. With such a configuration, the omnidirectional moving wheel 101 may move forward/backward, left/right, and diagonally in any direction from the spot.

The inverted pendulum type vehicle 100 may be provided with a turning wheel in addition to the omnidirectional moving wheel 101. For example, the turning wheel may be disposed as a rear wheel of the omnidirectional moving wheel 101, and the direction of the inverted pendulum type vehicle 100 may be changed by rotating on a rotation axis orthogonal to the rotation axis of the large diameter wheel 101A. That is, when only the turning wheel is rotated, the inverted pendulum type vehicle 100 is rotated on the spot, and when the large diameter wheel 101A and the turning wheel are rotated at the same time, the inverted pendulum type vehicle 100 may be turned forward while changing its direction in the traveling direction.

Figure 4:
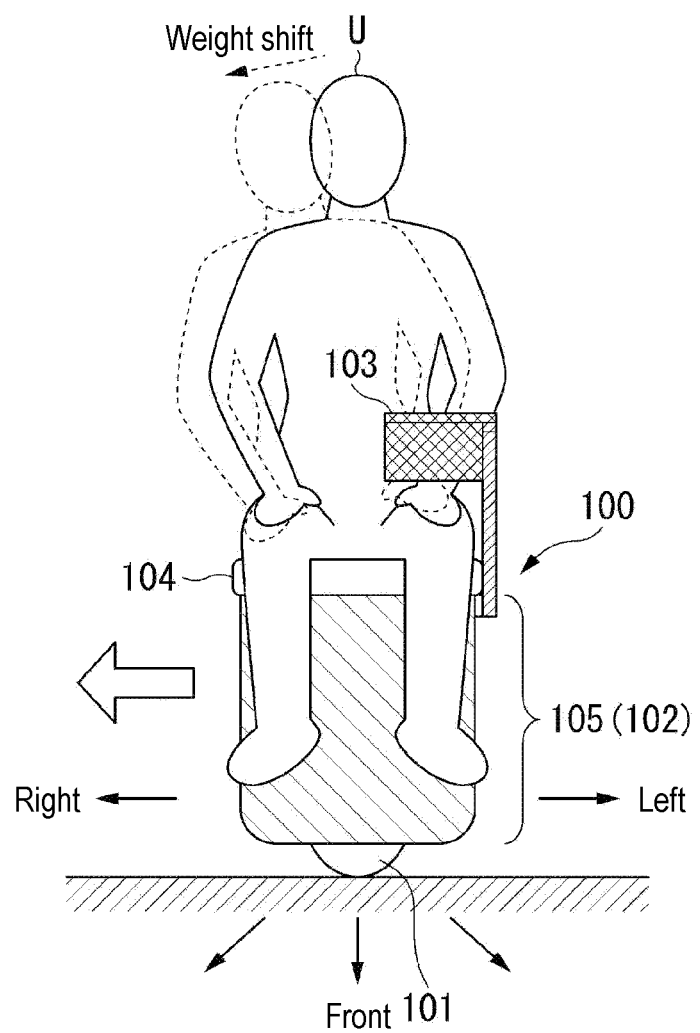
FIG. 4 is a first diagram showing an operation example of the inverted pendulum type vehicle.
Figure 5:
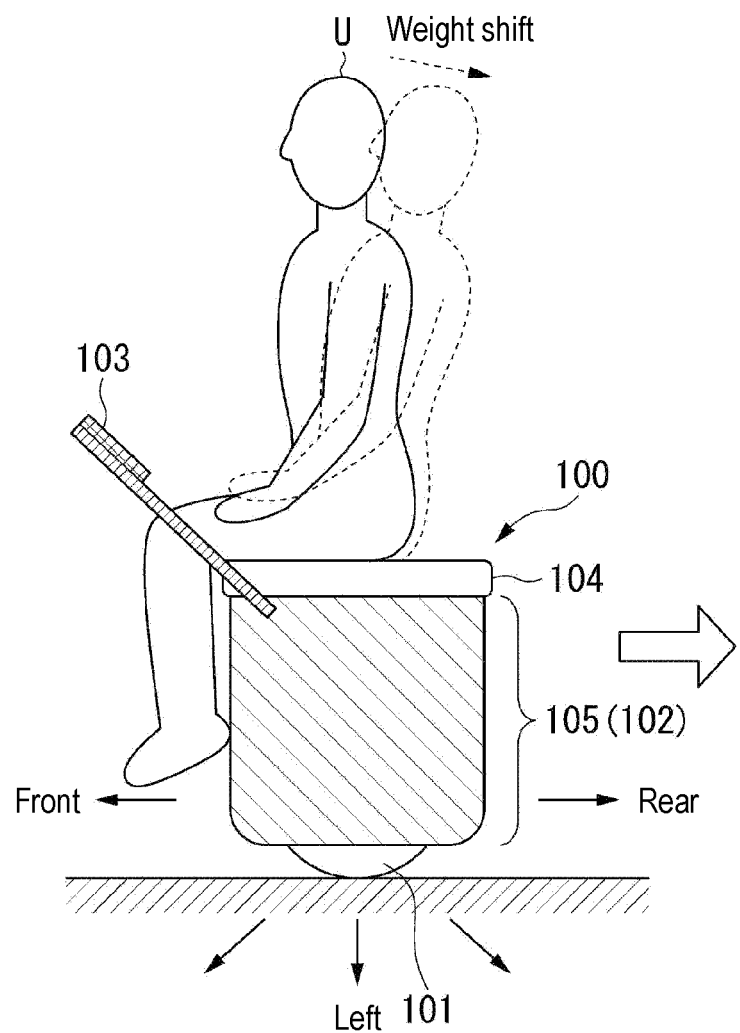
FIG. 5 is a second diagram showing an operation example of the inverted pendulum type vehicle.

FIG. 4 and FIG. 5 are diagrams showing an operation example of the inverted pendulum type vehicle 100. The inverted pendulum type vehicle 100 is equipped with an IMU sensor for detecting the balance state of the own vehicle, and the inverted pendulum type vehicle 100 is configured to balance the own vehicle based on the detection result of the IMU sensor. FIG. 4 shows a case where the user U shifts his or her weight in the right direction with the front direction of the paper as the front direction with respect to the inverted pendulum type vehicle 100 configured as described above. In this case, the inverted pendulum type vehicle 100 moves to the right in order to restore the balance lost due to the weight shift of the user U. Further, FIG. 5 shows a case where the user U shifts his or her weight in the rear direction (to the right of the paper), and in this case, the inverted pendulum type vehicle 100 moves in the rear direction in order to restore the balance. By performing such balance control, the user U may instruct the moving direction to the inverted pendulum type vehicle 100 by shifting the weight in the direction in which he or she wants to travel. Further, when the user U makes a large weight shift, the inverted pendulum type vehicle 100 is controlled to move faster in order to restore the balance. As a result, the user U may adjust the moving speed of the inverted pendulum type vehicle 100 by changing the magnitude of the weight shift of the user U.

Figure 6:
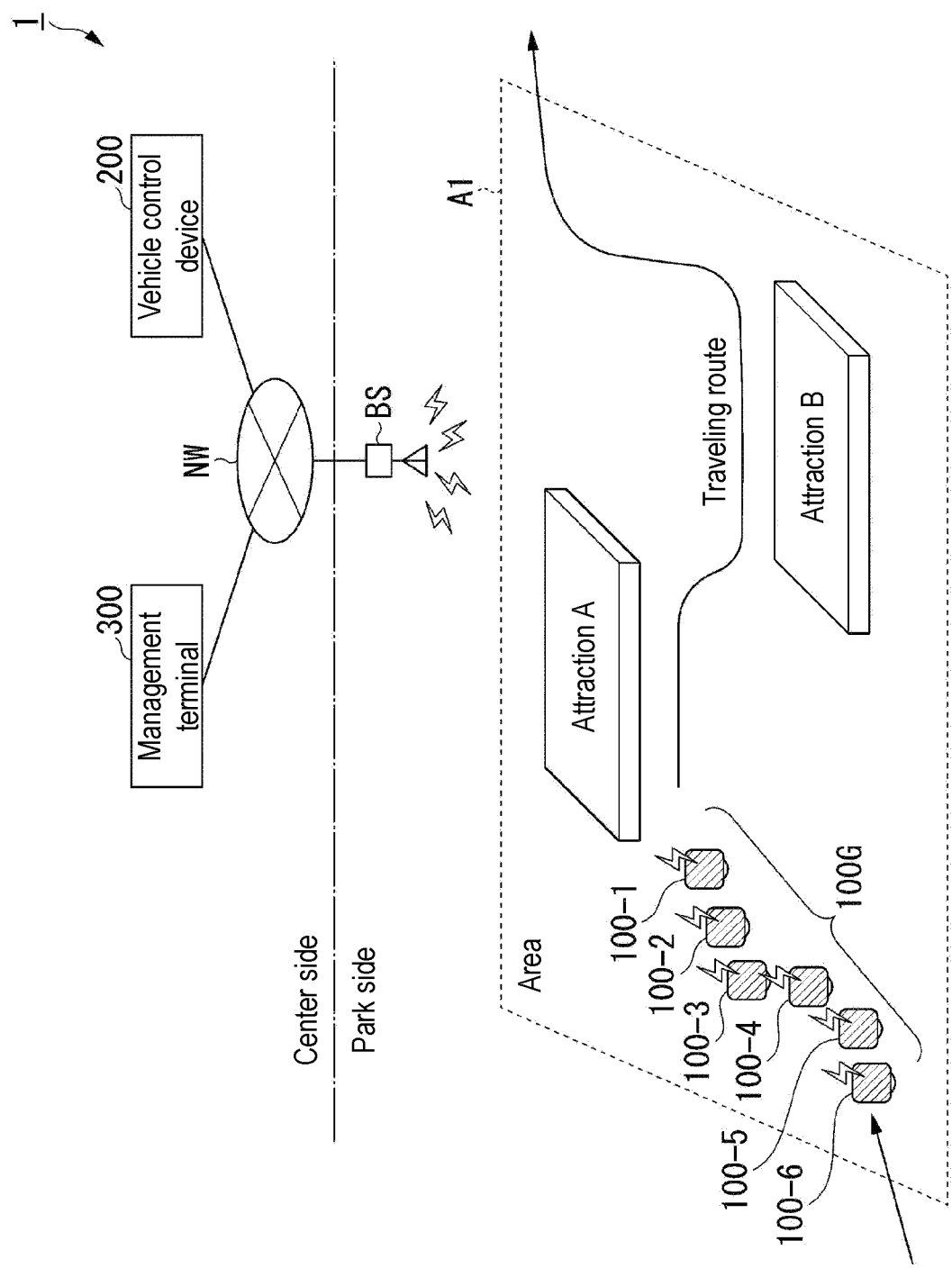
FIG. 6 is a diagram showing an outline of the vehicle control system 1 according to an embodiment.

FIG. 6 is a diagram showing an outline of the vehicle control system 1 according to an embodiment. For example, the vehicle control system 1 is used as a control system for the inverted pendulum type vehicle 100 that provides a user with a means of transportation within a park in a facility such as an amusement park or a theme park (hereinafter, simply referred to as a "park"). The vehicle control system 1 includes, for example, multiple inverted pendulum type vehicles 100, a vehicle control device 200, and a management terminal 300. The example of FIG. 6 shows inverted pendulum type vehicles 100-1 to 100-6 as multiple inverted pendulum type vehicles 100. The inverted pendulum type vehicles 100-1 to 100-6 have a wireless communication function and are connected to a network NW via a wireless base station BS. The inverted pendulum type vehicles 100-1 to 100-6 may communicate with the vehicle control device 200 via the network NW. In addition, the vehicle control device 200 and the management terminal 300 are disposed in a data center of the operator of the park and may communicate with the inverted pendulum type vehicles 100-1 to 100-6 moving in the park via the network NW. The network NW may be a local area network (LAN) or may include a wide area network (WAN).

FIG. 6 shows a state in which users U1 to U6, who have moved from another area by the inverted pendulum type vehicles 100-1 to 100-6, view attraction A and attraction B and move to another area in a certain area A1 in the park. In this embodiment, the vehicle control device 200 controls the operation of the inverted pendulum type vehicles 100-1 to 100-6 so that the inverted pendulum type vehicles 100-1 to 100-6 move as a group. For example, FIG. 6 shows a case where the inverted pendulum type vehicles 100-1 to 100-6 are controlled to move by traveling in a procession. Traveling in a procession is an example of moving as a group. Hereinafter, a mode of traveling in which multiple inverted pendulum type vehicles 100 move as a group is referred to as "group traveling."

Specifically, the vehicle control device 200 wirelessly communicates with the inverted pendulum type vehicles 100-1 to 100-6 via the wireless base station BS, and acquires the respective position information from the inverted pendulum type vehicles 100-1 to 100-6. The vehicle control device 200 recognizes the positional relationship between the inverted pendulum type vehicles 100-1 to 100-6 based on the acquired position information, generates control information (hereinafter referred to as "group control information") for causing the inverted pendulum type vehicles 100-1 to 100-6 to group travel based on the recognized positional relationship, and transmits it to each vehicle. The management terminal 300 is a device for registering various settings related to control of group traveling in the vehicle control device 200. For example, the management terminal 300 may be a portable terminal device such as a smart phone or a tablet, or may be a terminal device such as a PC fixedly installed in a predetermined place. It may be installed in any place as long as it may communicate with the vehicle control device 200.

In the following, unless otherwise specified, each of the inverted pendulum type vehicles 100-1 to 100-6 is all referred to as the inverted pendulum type vehicle 100, and a group of inverted pendulum type vehicles 100-1 to 100-6 is collectively referred to as an inverted pendulum type vehicle group 100G. Further, unless otherwise specified, the users U1 to U6 are collectively referred to as the user U.

Figure 7:
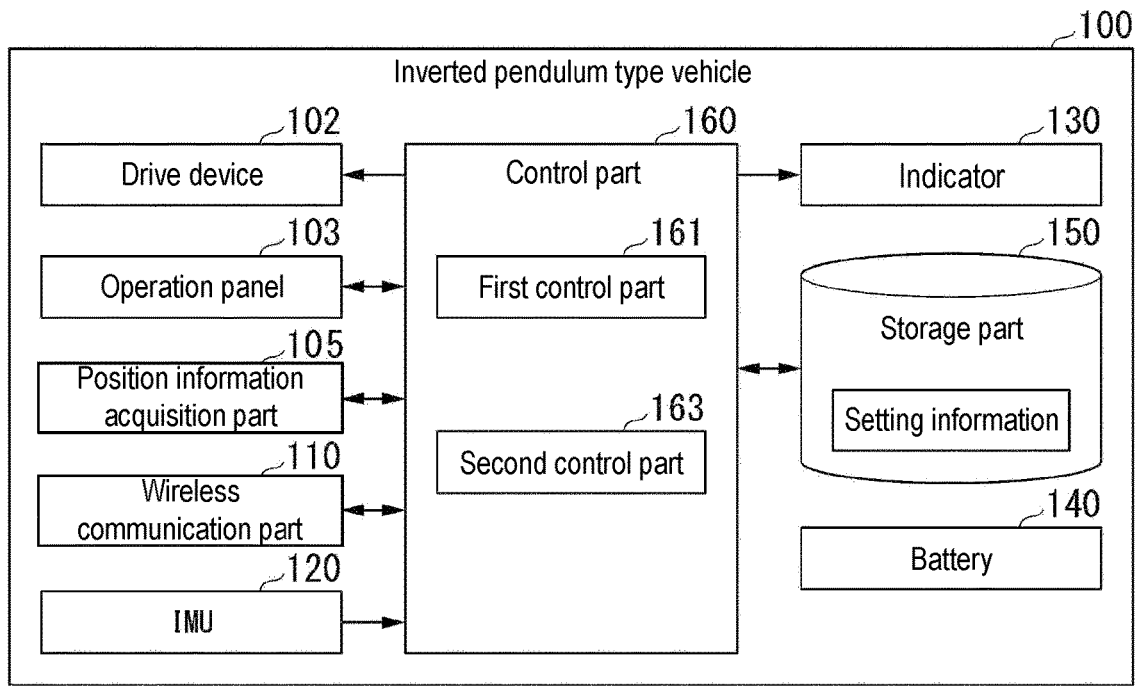
FIG. 7 is a diagram showing an example of a functional configuration of the inverted pendulum type vehicle 100 according to this embodiment.

FIG. 7 is a diagram showing an example of a functional configuration of the inverted pendulum type vehicle 100 according to this embodiment. The inverted pendulum type vehicle 100 includes, for example, a drive device 102, an operation panel 103, a position information acquisition part 105, a wireless communication part 110, an IMU 120, an indicator 130, a battery 140, a storage part 150, and a control part 160. The inverted pendulum type vehicle 100 is realized by, for example, a hardware processor such as a central processing unit (CPU) executing a program (software). In addition, some or all of these components may be realized by hardware (a circuit part, including circuitry) such as a large scale integration (LSI), an application specific integrated circuit (ASIC), a field-programmable gate array (FPGA), a graphics processing unit (GPU) and the like, or may be realized by the cooperation of software and hardware. The program may be stored in advance in a storage device such as the storage part 150 (a storage device including a non-transient storage medium), or may be stored in a removable storage medium such as a DVD or a CD-ROM, and may be installed in the storage part 150 of the inverted pendulum type vehicle 100 or the like by attaching the storage medium (non-transient storage medium) to the drive device.

The drive device 102 and the operation panel 103 are as described above. The drive device 102 drives the omnidirectional moving wheel 101 under the control of the control part 160. The operation panel 103 receives an input operation for the inverted pendulum type vehicle 100 and outputs it to the control part 160, and also outputs information such as image and sound output by the control part 160. The position information acquisition part 105 includes, for example, a global positioning system (GPS) transmitter, acquires the position information of the own vehicle, and provides it to the vehicle control device 200.

The wireless communication part 110 is a communication interface for connecting the inverted pendulum type vehicle 100 to the network NW. The wireless communication part 110 communicates with the vehicle control device 200 via the network NW. The wireless communication part 110 may be a wireless local area network (LAN) interface based on Wi-Fi (registered trademark), Bluetooth (registered trademark), or the like, or may be a wide area network (WAN) interface connected to a cellular network, a dedicated line, or the like.

The inertial measurement unit (IMU) 120 is a sensor that detects a three-dimensional inertial motion. The IMU 120 includes an acceleration sensor that detects translational motion, a gyro sensor that detects rotational motion, and the like.

The indicator 130 is a device such as a sign, a meter, a display, a pointer, an index, and the like, and is a device for indicating decorations related to the state of the inverted pendulum type vehicle 100 and the user U.

The battery 140 functions as a power supply for supplying power to each part of the inverted pendulum type vehicle 100. As the battery 140, for example, a rechargeable storage battery such as a lithium ion battery, a nickel hydrogen battery, or a nickel cadmium battery is used. The battery 140 may be fixed to the inverted pendulum type vehicle 100 or may be detachable from the inverted pendulum type vehicle 100.

The storage part 150 is a storage device such as a hard disk drive (HDD), a solid state drive (SSD), a flash memory, or the like. The storage part 150 stores various information related to the control of the inverted pendulum type vehicle 100.

The control part 160 controls the operation of the inverted pendulum type vehicle 100. The control part 160 includes, for example, a first control part 161 and a second control part 162. The first control part 161 recognizes the driving operation due to the weight shift of the user U under the balance control based on the detection result of the IMU 120, and controls the operation of the omnidirectional moving wheel 101 so as to move in the direction of the detected weight shift at a speed corresponding to the magnitude of the weight movement. As a result, the user U may operate the inverted pendulum type vehicle 100 by the driving operation as described with reference to FIGS. 4 and 5.

The second control part 162 operates in cooperation with the first control part 161 based on the group control information received from the vehicle control device 200, and controls the traveling of the own vehicle so that the own vehicle travels as a member vehicle of the inverted pendulum type vehicle group 100G in a group together with other member vehicles. For example, the second control part 162 receives information indicating a movement direction, a movement speed, a movement destination, a direction of the own vehicle, and the like as group control information for causing the own vehicle to group travel from the vehicle control device 200. The second control part 162 determines the operation amount required to drive the own vehicle in the mode notified by the group control information for each functional part of the own vehicle, and operates each functional part with the determined operation amount, whereby the own vehicle may be made to group travel.

Figure 8:
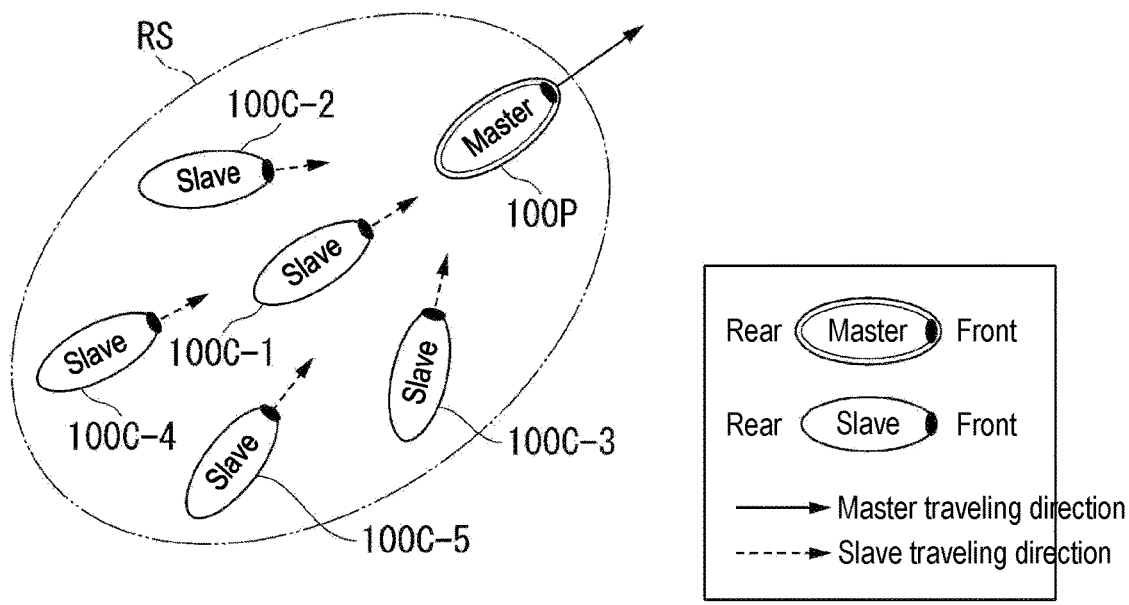
FIG. 8 is a diagram showing an example of group traveling by multiple inverted pendulum type vehicles 100.
Figure 9:
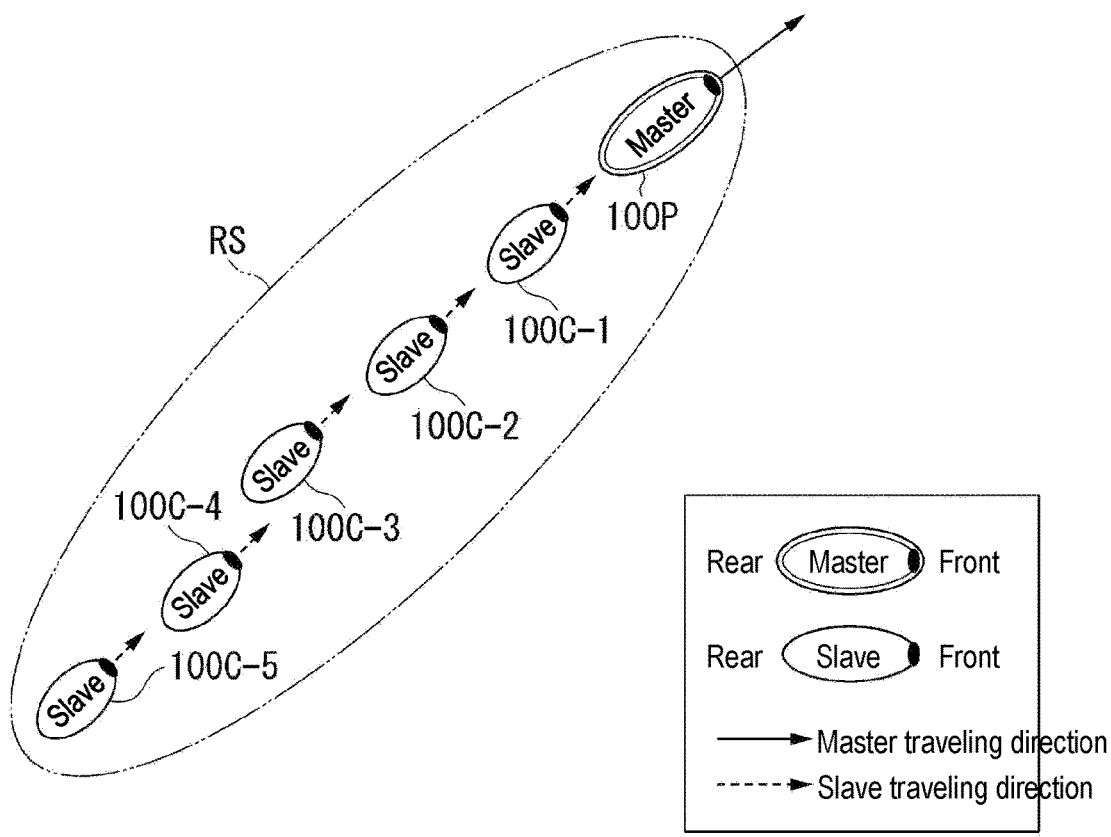
FIG. 9 is a diagram showing an example of group traveling by multiple inverted pendulum type vehicles 100.

FIG. 8 and FIG. 9 are diagrams showing an example of group traveling by multiple inverted pendulum type vehicles 100. In the vehicle control system 1 of this embodiment, the inverted pendulum type vehicle group 100G is configured to include one or more master devices and one or more slave devices, and the vehicle control device 200 is configured to perform group control as a master device or to perform group control as a slave device for each member vehicle. In the group traveling, the master device is controlled to travel mainly in a manner of leading the slave device, and the slave device is controlled to travel mainly in a manner of being led by the master device. In this embodiment, the member vehicle of the inverted pendulum type vehicle group 100G is configured to function as either a master device or a slave device.

For example, in the inverted pendulum type vehicle 100, setting information indicating whether to function as a master device or a slave device is registered in advance in the storage part 150, and the inverted pendulum type vehicle 100 registers the role of the own vehicle in the vehicle control device 200 by transmitting setting information to the vehicle control device 200, for example, at the time of activation. The vehicle control device 200 recognizes the role (master device or slave device) of each vehicle based on the setting information registered in this way, and generates group control information for causing each vehicle to perform group travel in an manner according to its role. The role of each vehicle may be registered in the vehicle control device 200 by the park manager or the like using the management terminal 300.

In the following, the inverted pendulum type vehicle 100 as a master device will be referred to as a master 100P, and the inverted pendulum type vehicle 100 as a slave device will be referred to as a slave 100C. Further, in the following, the inverted pendulum type vehicle group 100G including one master 100P and five slaves 100C-1 to 100-5 is assumed as an example.

FIG. 8 shows an example in which each of the slaves 100C-1 to 100C-5 of the inverted pendulum type vehicle group 100G follows the master 100P to group travel. For example, in this case, the vehicle control device 200 sets the movement destination of the master 100P to a predetermined destination in the park, and sets the movement destination of each of the slaves 100C-1 to 100C-5 to the master, whereby it is possible to realize the group traveling of FIG. 8.

Further, FIG. 9 shows an example in which the inverted pendulum type vehicle group 100G group travels by forming a procession. Group traveling in such an embodiment is generally called procession traveling. For example, in this case, the vehicle control device 200 sets a predetermined destination in the park as a movement destination for the master 100P as in the example of FIG. 8, and sets the master 100P and the slaves 100C-1, 100C-2, 100C-3, and 100C-4 as the respective movement destinations for the slaves 100C-1 to 100C-5, whereby it is possible to realize the procession traveling of FIG. 9.

It should be noted that FIGS. 8 and 9 each show an example of group traveling, and the mode of group traveling is not limited to the procession traveling shown in the drawings. The group traveling may be any form of traveling as long as the members of the inverted pendulum type vehicle group 100G are controlled to move while being controlled within a predetermined range (hereinafter referred to as a "group range") RS.

In this way, the inverted pendulum type vehicle 100, which is a member vehicle of the inverted pendulum type vehicle group 100G, allows the user U to operate to some extent by the coordinated control of the first control part 161 and the second control part 162, and basically, it is controlled so as not to leave the group range RS of the inverted pendulum type vehicle group 100G to which it belongs. Therefore, the inverted pendulum type vehicle 100 is controlled so as to be able to leave the group range RS during the group traveling by the driving operation of the user U.

Figure 10:
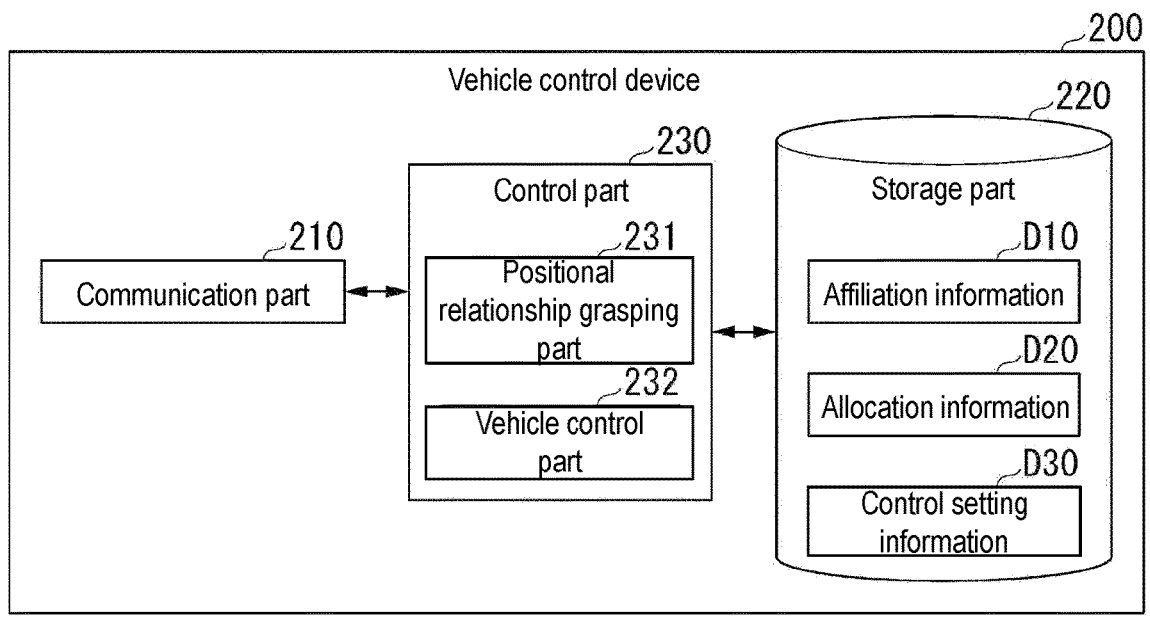
FIG. 10 is a diagram showing an example of a functional configuration of the vehicle control device 200 according to this embodiment.

FIG. 10 is a diagram showing an example of a functional configuration of the vehicle control device 200 according to this embodiment. The vehicle control device 200 includes, for example, a communication part 210, a storage part 220, and a control part 230. The vehicle control device 200 is realized by, for example, a hardware processor such as a CPU executing a program (software). In addition, some or all of these components may be realized by hardware (a circuit part, including circuitry) such as a LSI, an ASIC, a FPGA, a GPU and the like, or may be realized by the cooperation of software and hardware. The program may be stored in advance in a storage device such as the storage part 150 (a storage device including a non-transient storage medium), or may be stored in a removable storage medium such as a DVD or a CD-ROM, and may be installed in the storage part 220 of the vehicle control device 200 or the like by attaching the storage medium (non-transient storage medium) to the drive device.

The communication part 210 is a communication interface for connecting the vehicle control device 200 to the network NW. The communication part 210 communicates with the inverted pendulum type vehicle 100 and the management terminal 300 via the network NW.

The storage part 220 is a storage device such as a HDD, a SSD, a flash memory, or the like. The storage part 220 stores various information related to the operation of the vehicle control device 200. For example, the storage part 220 stores, for each inverted pendulum type vehicle 100, affiliation information D10 indicating the inverted pendulum type vehicle group 100G to which it belongs, allocation information D20 indicating the allocation of the master 100P and the slave 100C in the inverted pendulum type vehicle group 100G, control setting information D30 indicating how to control the group traveling of each inverted pendulum type vehicle group 100G, and the like.

The control part 230 performs a process for causing the inverted pendulum type vehicle group 100G to group travel. The control part 230 includes, for example, a positional relationship grasping part 231 and a vehicle control part 232. The positional relationship grasping part 231 acquires position information from each member vehicle of the inverted pendulum type vehicle group 100G, and grasps the positional relationship of each member vehicle based on the acquired position information. In addition, the positional relationship grasping part 231 is configured to recognize the surrounding environment of the inverted pendulum type vehicle group 100G based on the map information in the park and the detection information of people, obstacles, and the like in the park, and to grasp the positional relationship between each member vehicle and the positional relationship between the surrounding environment and each member vehicle.

The vehicle control part 232 controls the movement mode so that each member vehicle group travels based on the positional relationship recognized for the member vehicles of the inverted pendulum type vehicle group 100G. More specifically, the vehicle control part 232 controls each member vehicle so that each member vehicle does not leave the group range RS, and changes the movement mode of other member vehicles according to the movement result of some member vehicles.

Hereinafter, some specific examples of the control method of the group traveling of the inverted pendulum type vehicle group 100G by the vehicle control device 200 will be described.

Figure 11:
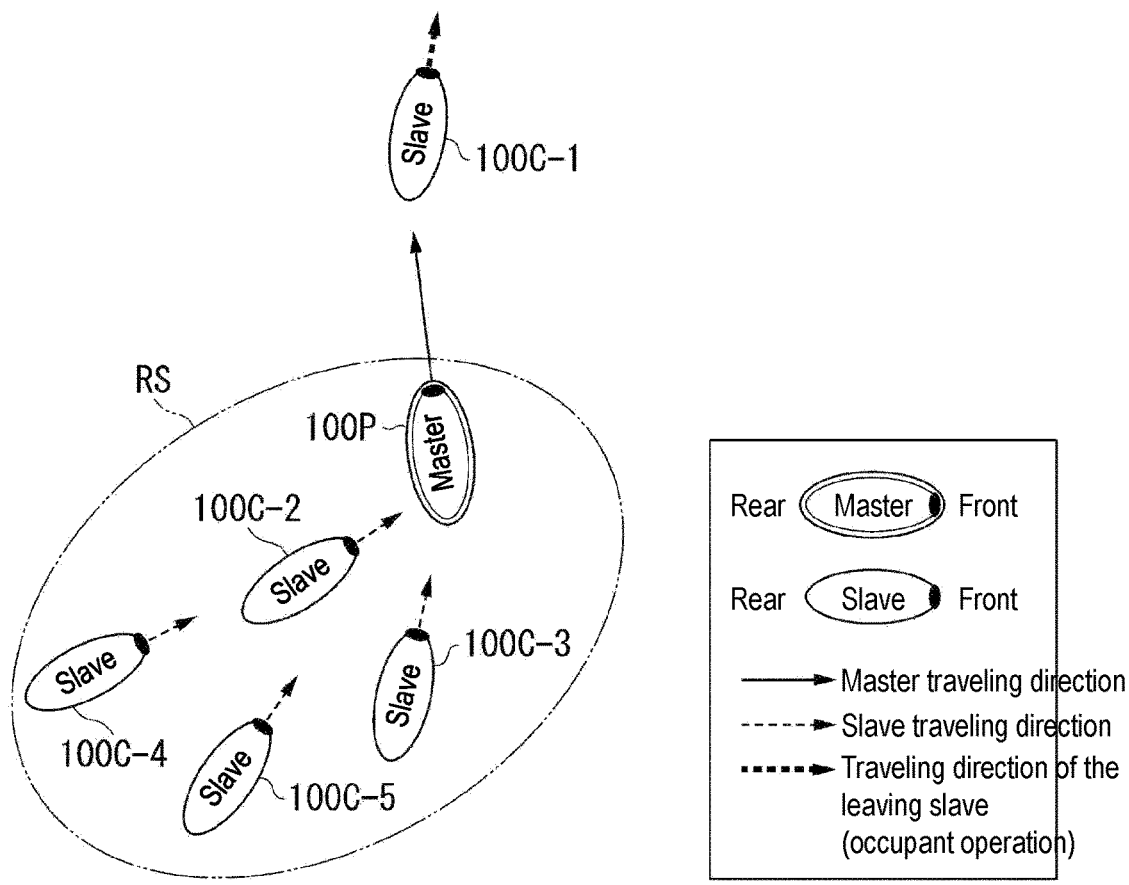
FIG. 11 is a diagram illustrating a first control method.

FIG. 11 is a diagram illustrating a first control method. The first control method is a control method which, in a certain inverted pendulum type vehicle group 100G, when any of the slaves 100C leaves the group range, controls the inverted pendulum type vehicle group 100G so as to follow at least the slave 100C which has left the master 100P among other slaves 100C and the master 100P. Here, FIG. 11 shows an example in which the slave 100C-1 leaves the group range in the inverted pendulum type vehicle group 100G in which the slaves 100C-1 to 100C-5 are moving following the master 100P. In this example, the master 100P is controlled to follow the slave 100C-1, and the other slaves 100C-2 to 100C-5 are controlled to follow the master 100P, but a part or all of the slaves 100C-2 to 100C-5 may be controlled to follow the slave 100C-1.

Figure 12:
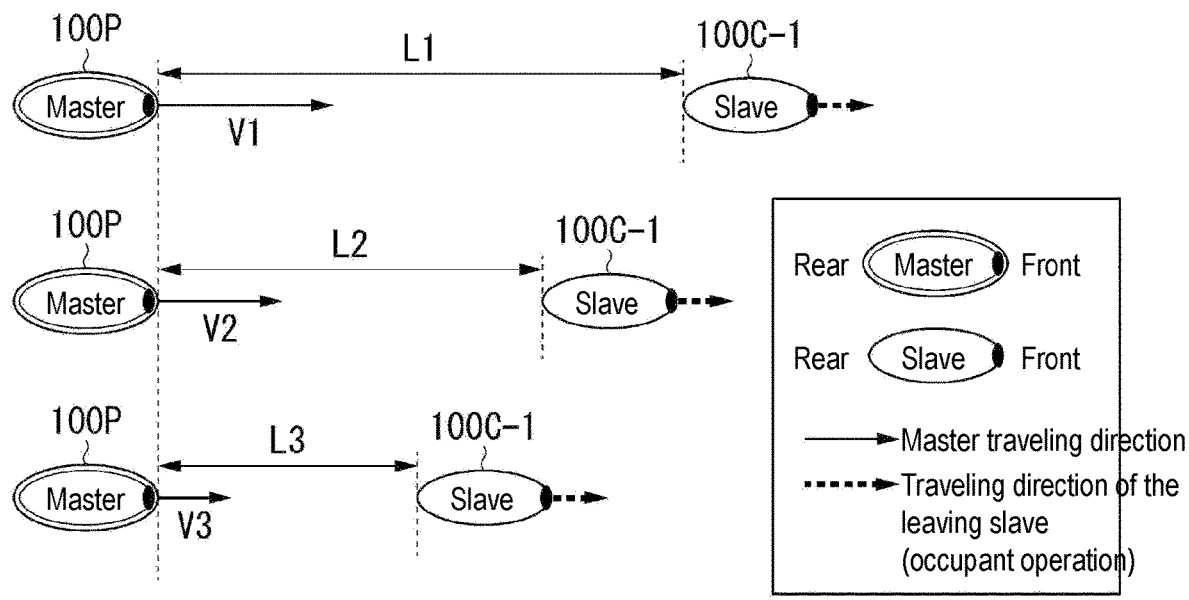
FIG. 12 is a diagram illustrating a second control method.

FIG. 12 is a diagram illustrating a second control method. The second control method is a control method which, in the first control method, controls the speed of the master 100P or other slaves 100C according to the distance between the leaving slave 100C and the following master 100P or other slaves 100C. FIG. 12 shows an example of controlling the speed of the master 100P when the master 100P follows the leaving slave 100C-1. In FIG. 12, the length of the arrow represents the magnitude of the speed. In the example of FIG. 12, when the distance between the master 100P and the slave 100C-1 is L1, L2 or L3 (L1>L2>L3), the vehicle control device 200 controls the following speed of the master 100P so that the speeds are V1, V2, or V3 (V1>V2>V3) according to the magnitude of the distance. According to the second control method, the further the slave 100C-1 leaves the group range, other vehicles are made to follow the the slave 100C-1 at a faster speed; therefore, other vehicles may quickly catch up with the leaving slave 100C-1. For example, when a child controls a slave 100C and a parent operates a master 100P, it is possible to prevent the parent from losing sight of the child who has left the group. In addition, the closer the leaving slave 100C is to the inverted pendulum type vehicle group 100G, the slower the other vehicles will follow, so that the leaving slave 100C (hereinafter referred to as "leaving vehicle") may be tracked without disturbing the traffic environment in the park more than necessary.

Figure 13:
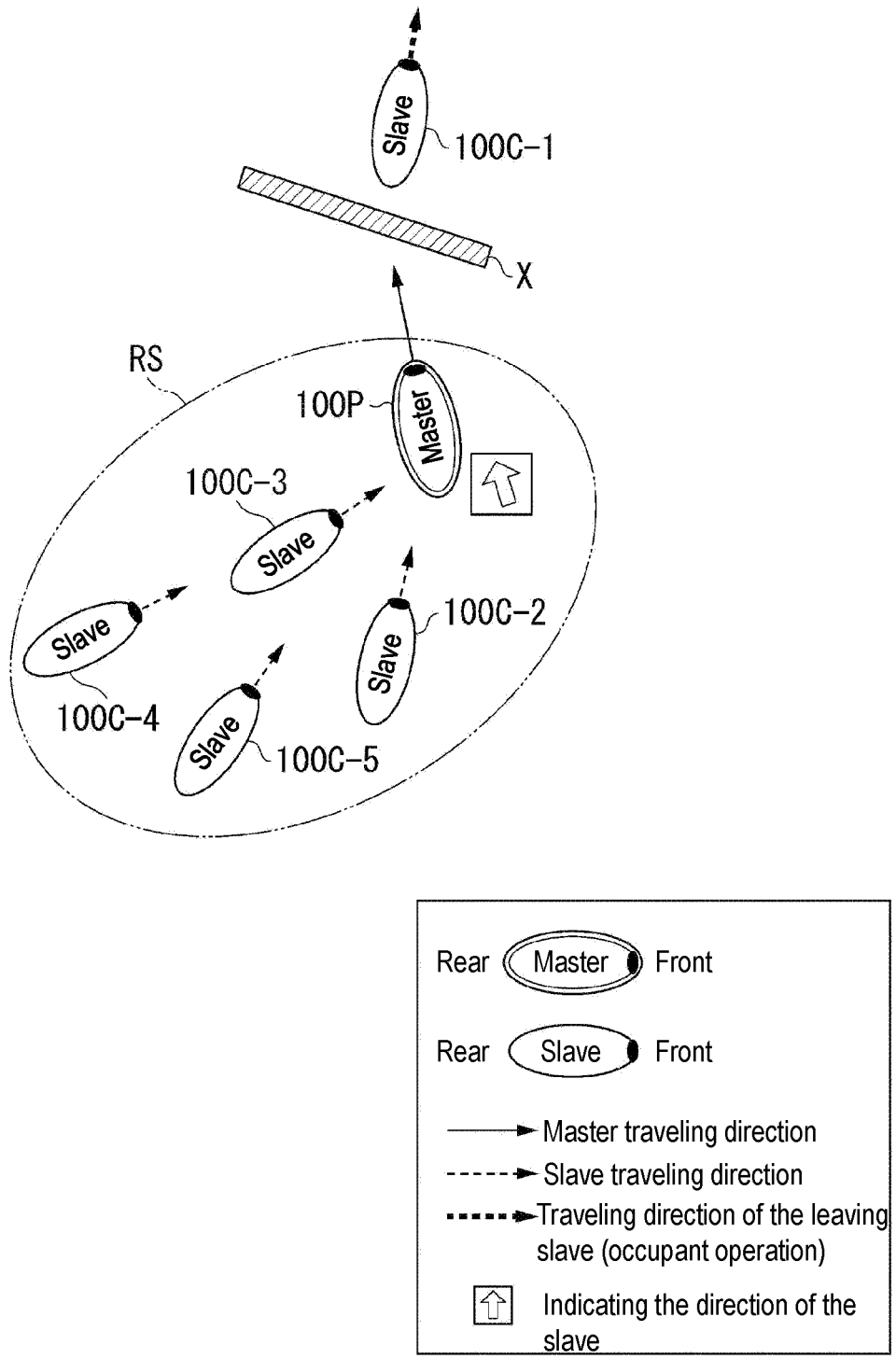
FIG. 13 is a diagram illustrating a third control method.

FIG. 13 is a diagram illustrating a third control method. The third control method is a control method which, in the first control method, indicates the direction in which the leaving vehicle is located at least to the master 100P among the following vehicles following the leaving vehicle. Specifically, the vehicle control device 200 calculates the direction of the leaving vehicle as seen from the master 100P based on the position information of the leaving vehicle and the position information of the master 100P, and instructs the master 100P to indicate the information indicating the calculated direction. In response to this instruction, the master 100P uses the indicator 130 to indicate the direction of the leaving vehicle. According to such a third control method, the following vehicle such as the master 100P may track the leaving vehicle while being aware of the direction in which the leaving vehicle is located, so that even if the leaving vehicle is behind an obstacle X and is not visible as shown in FIG. 13, for example, it is assured that the leaving vehicle may be tracked with the confidence that the leaving vehicle is located behind the obstacle X. The third control method may be combined with the second control method.

Figure 14:
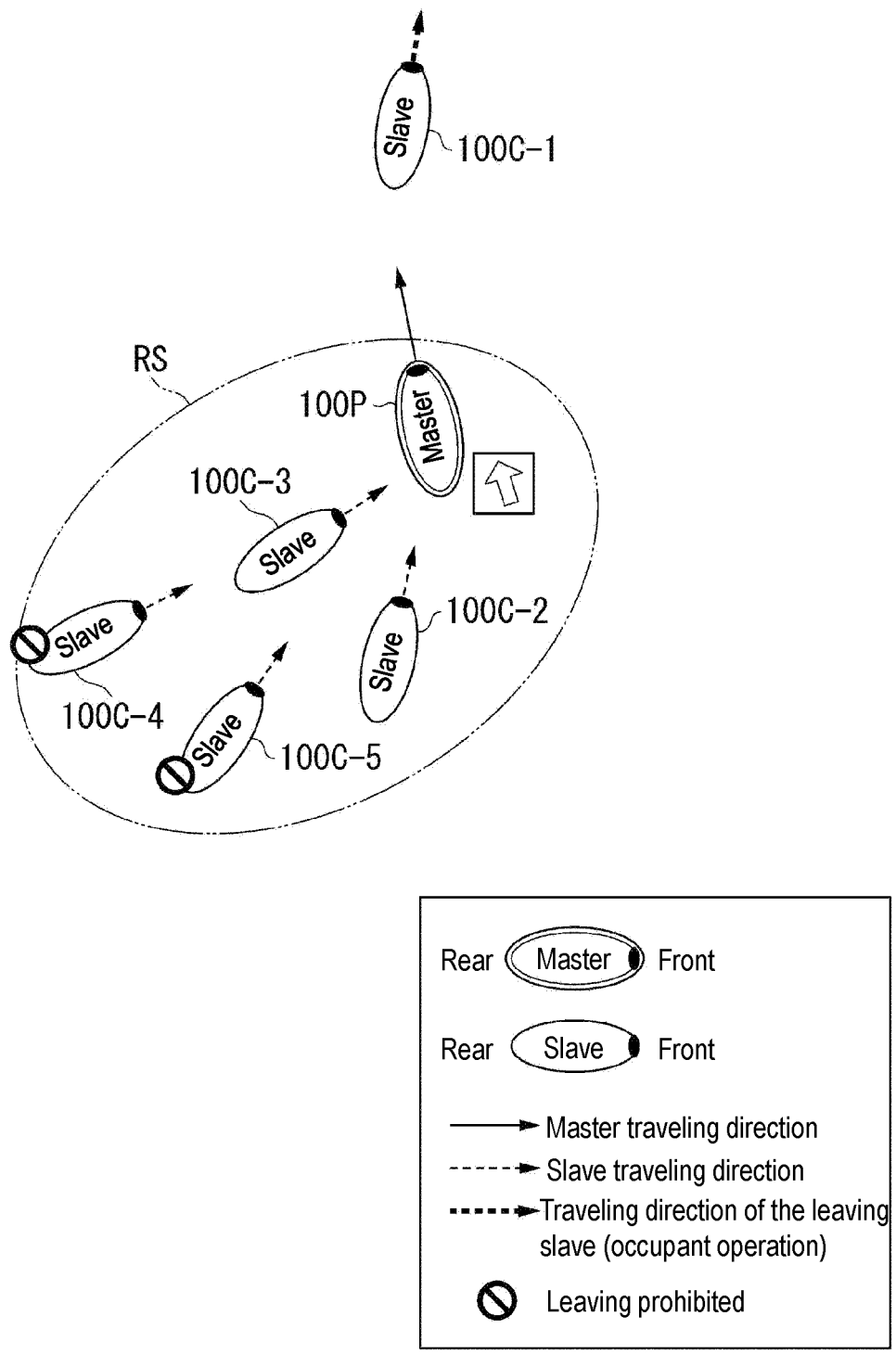
FIG. 14 is a diagram illustrating a fourth control method.

FIG. 14 is a diagram illustrating a fourth control method. The fourth control method is a control method which sets in advance the inverted pendulum type vehicle 100 that may not leave the group range in the inverted pendulum type vehicle group 100G. For example, FIG. 14 shows a case where the slaves 100C-1 and 100C-2 are set as leaving-prohibited vehicles among the slaves 100C-1 to 100C-5. In this case, the slaves 100C-3 to 100C-5 may move beyond the group range by the control of the user U. In addition, since the slaves 100C-1 and 100C-2 are set as leaving-prohibited vehicles, they may not leave the group range.

Specifically, the leaving-prohibited vehicle is realized by disabling the operation of the user U in the inverted pendulum type vehicle 100. For example, the vehicle control device 200 may be configured to disable the operation of the user U when the slave 100C set as a leaving-prohibited vehicle is about to leave the inverted pendulum type vehicle group 100G, or the slave 100C set as a leaving-prohibited vehicle may be configured to always disable the operation of the user U. Further, the inverted pendulum type vehicle 100 may be configured to disable the operation of the user U at all times when it is set as a leaving-prohibited vehicle. According to such a fourth control method, the inverted pendulum type vehicle 100 rented out to the user U who has difficulty operating independently is set as a leaving-prohibited vehicle in advance, so that it is possible to provide a means of transportation by group traveling even to a group including such a user U.

Figure 15:
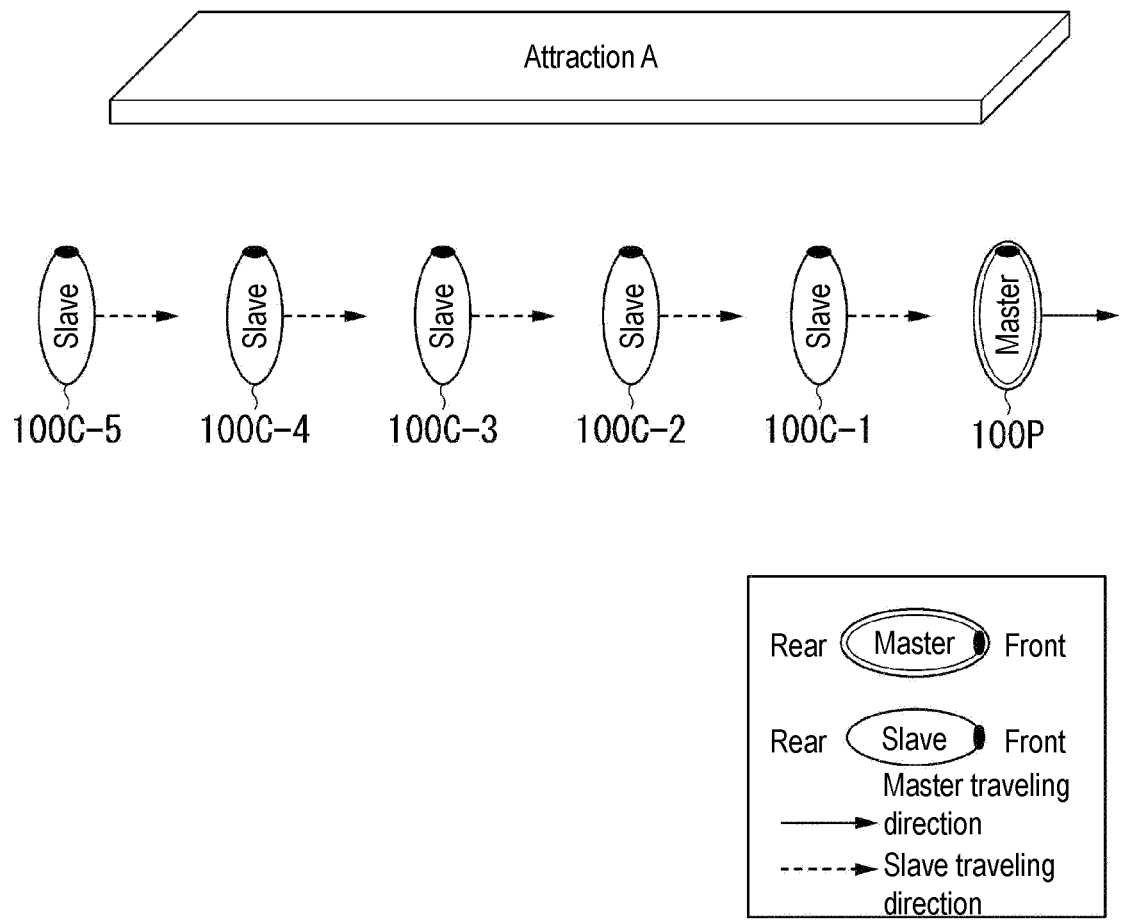
FIG. 15 is a diagram illustrating a fifth control method.

FIG. 15 is a diagram illustrating a fifth control method. The fifth control method is a control method which controls the direction of the vehicle while the inverted pendulum type vehicle group 100G is traveling. For example, FIG. 15 shows a case where the inverted pendulum type vehicle group 100G traveling in a procession with the master 100P at the head is traveling in a procession while facing the front of each inverted pendulum type vehicle 100 in the same direction. As described above, the inverted pendulum type vehicle 100 may start moving in any direction from the spot by the omnidirectional moving wheels. Therefore, in this case, the vehicle control device 200 directs the front of each vehicle of the inverted pendulum type vehicle group 100G in a direction perpendicular to the traveling direction, and moves each vehicle to the right, so that it is possible to realize the procession traveling of the example of FIG. 15. In this case, the group of users pass in front of the attraction A while looking at the attraction A in the front direction.

That is, according to the fifth control method, the inverted pendulum type vehicle group 100G may be moved in a direction different from the gaze direction while the group of users is gazed at a specific direction, so that it is possible to provide attractions with a higher sense of presence to the group of users.

Figure 16:
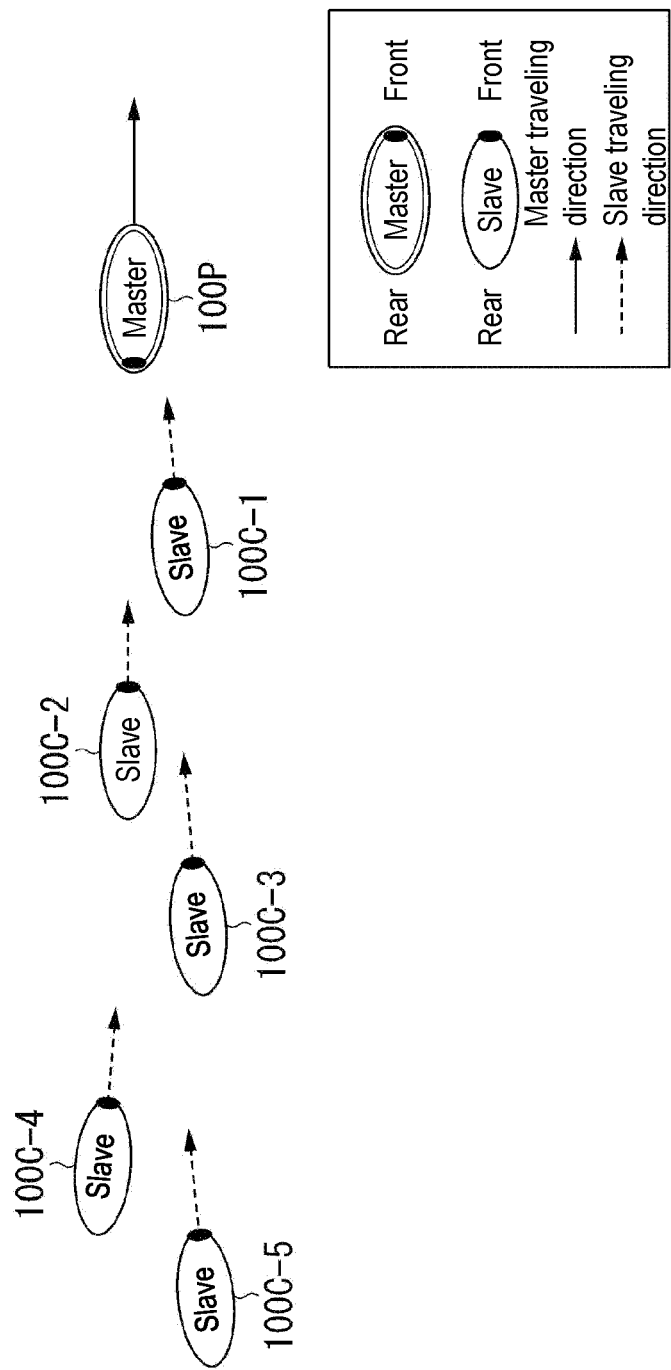
FIG. 16 is a diagram illustrating a sixth control method.

FIG. 16 is a diagram illustrating a sixth control method. Similar to the fifth control method, the sixth control method is a control method which controls the direction of the vehicle while the inverted pendulum type vehicle group 100G is traveling; whereas the fifth control method directs the front of each inverted pendulum type vehicle 100 in the same direction, the sixth control method is a control method which directs the front of the master 100P towards the slave 100C regardless of the traveling direction thereof. Since the master 100P plays a role of leading the slave 100C in the group traveling, it is often the case that the master 100P basically travels at the head of the group in the traveling direction. Therefore, in this case, as shown in FIG. 16, the master 100P travels while facing the front in the opposite direction to the traveling direction. That is, according to the sixth control method, the front direction of the master 100P may be directed to the slave 100C side regardless of the traveling direction of the master 100P. Therefore, in this case, the user U (for example, the leader) of the master 100P may lead the inverted pendulum type vehicle group 100G while visually confirming the following of the group and communicating with the group.

Figure 17:
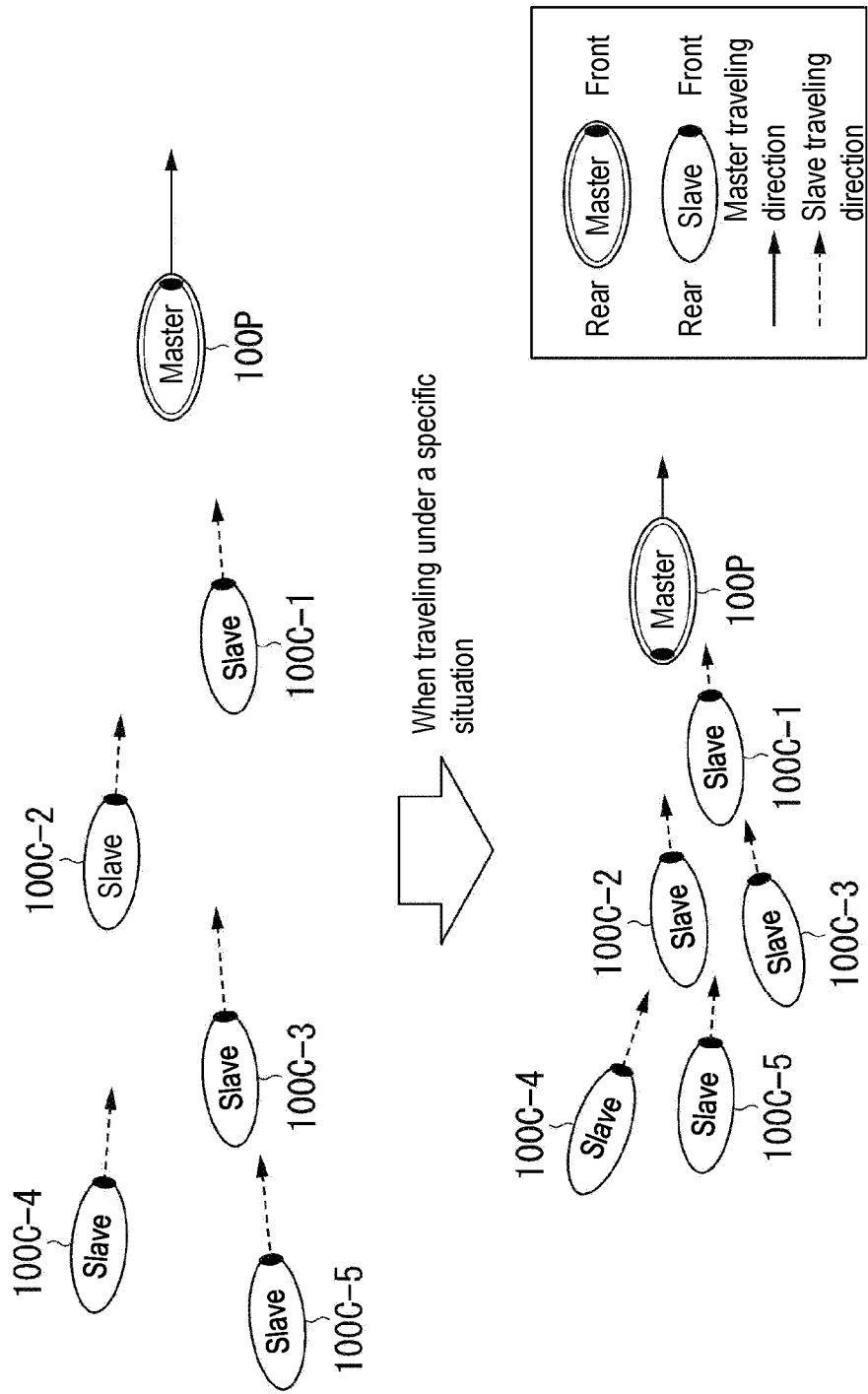
FIG. 17 is a diagram illustrating a seventh control method.

FIG. 17 is a diagram illustrating a seventh control method. The seventh control method is a control method which controls the inter-vehicle distance of the inverted pendulum type vehicle group 100G. Specifically, in the seventh control method, the inter-vehicle distance when the inverted pendulum type vehicle group 100G is traveling under a specific situation is smaller than the inter-vehicle distance when the inverted pendulum type vehicle group 100G is not traveling under a specific situation. For example, the specific situation may be that the inverted pendulum type vehicle group 100G is traveling in a specific place, or that the inverted pendulum type vehicle group 100G is traveling at a predetermined speed or less. According to such a seventh control method, the inter-vehicle distance of the inverted pendulum type vehicle group 100G may be maintained at an appropriate distance according to the traveling situation, so that the traveling mode of the inverted pendulum type vehicle group 100G may be limited according to the situation and place in the park.

The vehicle control system 1 of the embodiment configured in this way includes a positional relationship grasping part that grasps the positional relationship of multiple vehicles, and a vehicle control part that controls the movement mode of the multiple vehicles based on the positional relationship. The vehicle control part includes the vehicle control device 200 configured to control the multiple vehicles so as to move as a group, and, according to a movement result of a part of the multiple vehicles, to change the movement mode of another vehicle different from the part of vehicles. By including such a configuration, according to the vehicle control system 1 of the embodiment, multiple vehicles may be moved as a group with a higher degree of freedom.

In the above embodiment, the case where the vehicle control device 200 capable of communicating with each member vehicle via the network NW controls the group traveling of the inverted pendulum type vehicle group 100G has been described, but the group traveling control function may be configured to be provided in each inverted pendulum type vehicle 100 instead of the vehicle control device 200. For example, the positional relationship grasping part 231 and the vehicle control part 232 of the vehicle control device 200 may be provided in the master 100P of the inverted pendulum type vehicle group 100G. In this case, for example, each member vehicle has a wireless communication function such as Wi-Fi (registered trademark) or Bluetooth (registered trademark) and is configured to be able to communicate with other member vehicles. Further, in this case, the master 100P stores information such as the affiliation information D10, the allocation information D20, and the control setting information D30 in the storage part 150 in advance. For example, the master 100P may be configured to grasp the positional relationship between the member vehicles by collecting the respective position information from each slave 100C, or may be configured to grasp the positional relationship between the member vehicles based on information such as the wireless directivity and strength transmitted or received. In this case, the master 100P generates the group control information and transmits it to each slave 100C.

In the above embodiment, the vehicle control system 1 that controls the group traveling of the inverted pendulum type vehicle group 100G has been described, but the vehicle control system 1 is also applicable to the case where a moving body other than the inverted pendulum type vehicle 100 is made to group travel. More specifically, the vehicle control system 1 is applicable to the first to fourth control methods when controlling the group traveling of moving bodies having a wireless communication function, and is applicable to the fifth to seventh control methods when controlling the group traveling of moving bodies in which the traveling directions may be different from the front directions of the devices.

The embodiments described above may be expressed as follows.

A vehicle control device is configured to include:
a storage device that stores a program; and
a hardware processor, and
by executing the program by the hardware processor, the vehicle control device performs:
grasping a positional relationship of multiple vehicles;
performing a vehicle control process for controlling a movement mode of the multiple vehicles based on the positional relationship; and
in the vehicle control process, controlling the multiple vehicles to move as a group and, according to a movement result of a part of vehicles among the multiple vehicles, changing a movement mode of another vehicle different from the part of vehicles.

Although the modes for implementing the disclosure have been described above using the embodiments, the disclosure is not limited to these embodiments, and various modifications and replacements may be made without departing from the gist of the disclosure.

What is claimed is:

1. A moving body control device, comprising:
a positional relationship grasping part that grasps a positional relationship of a plurality of vehicles comprising a first vehicle as a master device that leads a slave device and a second vehicle as the slave device that is led by the first vehicle, wherein at least the first vehicle among the plurality of vehicles is an omnidirectional moving vehicle; and
a vehicle control part that controls a movement mode of the plurality of vehicles based on the positional relationship, wherein the vehicle control part controls the plurality of vehicles to move as a group and, according to a movement result of a part of vehicles among the plurality of vehicles, changes a movement mode of another vehicle different from the part of vehicles, causes the first vehicle to move in a predetermined direction and causes the second vehicle to follow the first vehicle, and always directing a front of the first vehicle toward a direction of any of the second vehicle regardless of a traveling direction of the first vehicle when the first vehicle is traveling.

2. The moving body control device according to claim 1, wherein the second vehicle is able to leave the group by an operation of an occupant, and when a third vehicle among the second vehicle leaves the group, the vehicle control part causes the first vehicle to follow the third vehicle.

3. The moving body control device according to claim 2, wherein the vehicle control part controls a following speed of the first vehicle in a way in which the first vehicle approaches the third vehicle faster when a distance between the first vehicle and the third vehicle is larger.

4. The moving body control device according to claim 3, wherein the vehicle control part causes the first vehicle to indicate a direction of the third vehicle as seen from the first vehicle.

5. The moving body control device according to claim 4, wherein the second vehicle comprises a fourth vehicle that has been prohibited from leaving the group in advance, and the vehicle control part controls the fourth vehicle so as not to leave the group.

6. The moving body control device according to claim 3, wherein the second vehicle comprises a fourth vehicle that has been prohibited from leaving the group in advance, and the vehicle control part controls the fourth vehicle so as not to leave the group.

7. The moving body control device according to claim 2, wherein the vehicle control part causes the first vehicle to indicate a direction of the third vehicle as seen from the first vehicle.

8. The moving body control device according to claim 7, wherein the second vehicle comprises a fourth vehicle that has been prohibited from leaving the group in advance, and the vehicle control part controls the fourth vehicle so as not to leave the group.

9. The moving body control device according to claim 2, wherein the second vehicle comprises a fourth vehicle that has been prohibited from leaving the group in advance, and the vehicle control part controls the fourth vehicle so as not to leave the group.

10. The moving body control device according to claim 1, wherein the plurality of vehicles are omnidirectional moving vehicles, and when the plurality of vehicles are traveling, the vehicle control part directs fronts of the plurality of vehicles in a same direction regardless of a traveling direction.

11. The moving body control device according to claim 1, wherein the vehicle control part makes an inter-vehicle distance of the plurality of vehicles when the plurality of vehicles are traveling under a specific situation smaller than the inter-vehicle distance when the plurality of vehicles are not traveling under the specific situation.

12. The moving body control device according to claim 1, wherein the second vehicle is able to leave the group by an operation of an occupant, and when a third vehicle among the second vehicle leaves the group, the vehicle control part causes the first vehicle to follow the third vehicle, the moving body control device further comprises an indicator for indicating a direction of the third vehicle as seen from the first vehicle.

13. A moving body control method, in which a computer performs:

grasping a positional relationship of a plurality of vehicles comprising a first vehicle as a master device that leads a slave device and a second vehicle as the slave device that is led by the first vehicle, wherein at least the first vehicle among the plurality of vehicles is an omnidirectional moving vehicle;

performing a vehicle control process for controlling a movement mode of the plurality of vehicles based on the positional relationship; and in the vehicle control process, controlling the plurality of vehicles to move as a group and, according to a movement result of a part of vehicles among the plurality of vehicles, changing a movement mode of another vehicle different from the part of vehicles, causing the first vehicle to move in a predetermined direction and causing the second vehicle to follow the first vehicle, and always directing a front of the first vehicle toward a direction of any of the second vehicle regardless of a traveling direction of the first vehicle when the first vehicle is traveling.

14. A non-transient computer-readable recording medium, recording a program which causes a computer to perform:

grasping a positional relationship of a plurality of vehicles comprising a first vehicle as a master device that leads a slave device and a second vehicle as the slave device that is led by the first vehicle, wherein at least the first vehicle among the plurality of vehicles is an omnidirectional moving vehicle;

performing a vehicle control process for controlling a movement mode of the plurality of vehicles based on the positional relationship; and in the vehicle control process, controlling the plurality of vehicles to move as a group and, according to a movement result of a part of vehicles among the plurality of vehicles, changing a movement mode of another vehicle different from the part of vehicles, causing the first vehicle to move in a predetermined direction and causing the second vehicle to follow the first vehicle, and always directing a front of the first vehicle toward a direction of any of the second vehicle regardless of a traveling direction of the first vehicle when the first vehicle is traveling.

* * * * *